United States Patent

Isbell, Jr.

[15] 3,645,683
[45] *Feb. 29, 1972

[54] REGENERATION OF ACID

[72] Inventor: Charles Levi Isbell, Jr., Charleston, W. Va.

[73] Assignee: E. I. du Pont de Nemours and Company, Wilmington, Del.

[*] Notice: The portion of the term of this patent subsequent to Dec. 22, 1987, has been disclaimed.

[22] Filed: Mar. 10, 1970

[21] Appl. No.: 18,323

Related U.S. Application Data

[60] Continuation of Ser. No. 724,303, Feb. 6, 1968, Pat. No. 3,549,320, which is a division of Ser. No. 349,536, Mar. 3, 1964, Pat. No. 3,419,601.

[52] U.S. Cl. ................................................. 23/177, 23/178
[51] Int. Cl. ........................................................ C01b 17/50
[58] Field of Search ........................... 23/168, 177, 178, 129

[56] References Cited

UNITED STATES PATENTS

| | | | |
|---|---|---|---|
| 2,739,039 | 3/1956 | Phelps | 23/129 |
| 3,275,407 | 9/1966 | Furkert et al. | 23/178 |
| 3,359,069 | 12/1967 | Furkert et al. | 23/178 |

*Primary Examiner*—Oscar R. Vertiz
*Assistant Examiner*—G. O. Peters
*Attorney*—Earl L. Handley

[57] ABSTRACT

Production for sulfur dioxide containing gas by spraying a waste liquor containing a sulfur acid and an ammonium salt into a reactor in the presence of molecular oxygen at a temperature of 850° C. to 1,150° C.

10 Claims, No Drawings

REGENERATION OF ACID

This application is a continuation of application Ser. No. 724,303. filed Feb. 6, 1968, now U.S. Pat. No. 3,549,320 issued Dec. 22, 1970, and said application is a division of application Ser. No. 349,536 filed Mar. 3, 1964, now U.S. Pat. No. 3,419,601 issued Dec. 31, 1968.

This invention relates to a cyclic process for the production of methyl methacrylate by the reaction of acetone cyanohydrin with sulfuric acid and methanol in which sulfuric acid is regenerated from a waste stream containing ammonium sulfate and recycled for reaction with additional acetone cyanohydrin.

It is known in the art to produce methyl methacrylate from acetone cyanohydrin by reacting acetone cyanohydrin with fuming sulfuric acid and methanol. See U.S. Pat. No. 2,042,458, issued June 2, 1936 to Crawford and U.S. Pat. No. 2,416,756, issued Mar. 7, 1947 to Jilk. Byproducts of this reaction include ammonium sulfate and ammonium hydrogen sulfate. These byproducts have only limited commercial value as obtained, and present a disposal problem which adversely affects economics of the overall process. Thus, the byproducts of this process have not been desirable. Ammonium sulfate has not been acceptable as a raw material for the production of sulfuric acid because the ammonium tends to recombine with the sulfate resulting in low yields of $SO_2$. Furthermore, the ammonium sulfate tends to form nitric oxides and these products are absorbed during the absorption of $SO_3$ thus resulting in an impure product.

It is an object of this invention to provide a process for the production of methyl methacrylate in which the sulfuric acid is regenerated and again reacted with acetone cyanohydrin. It is a further object of this invention to provide a process for the production of methyl methacrylate without formation of pollution forming byproducts. It is a further object of this invention to provide a use for sulfuric acid containing small amounts of nitric acid. It is a further object of this invention to provide a process for the production of sulfuric acid from ammonium sulfate containing materials in which the sulfuric acid is recovered at high yields. Other objects will be apparent to one skilled in the art from the remainder of the specification.

The above objects are accomplished and the above difficulties are overcome according to the present invention by reacting substantially pure acetone cyanohydrin with sulfuric acid, which reaction includes the formation of methacrylamide sulfate according to the following equation:

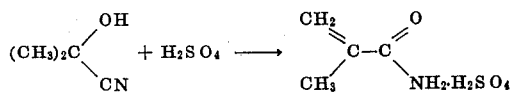

The reaction product is then reacted with methanol and water which reaction includes the formation of methyl methacrylate according to the following equation:

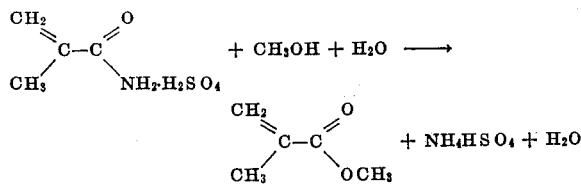

Other compounds present in the resulting mixture include $H_2SO_4$, $(NH_4)_2SO_4$, water, $C_3H_4O(NH_4SO_3)_2$ and organics having the empirical formula $C_5H_{10}O_3$.

The methyl methacrylate is then separated from the mixture by distillation, and the ammonium hydrogen sulfate containing portion is burned. The products resulting from the burning include $CO_2$, $O_2$, $H_2O$, $SO_2$, $N_2$, oxides of nitrogen, and $SO_3$. This effluent gas is then dried, heated and then passed over a catalyst in the presence of added amounts of oxygen. The $SO_2$ is oxidized to $SO_3$, and the $SO_3$ is removed from the gas by absorption with concentrated sulfuric acid forming fuming sulfuric acid (oleum). This absorption may take place using various techniques, such as a surface-type absorber in which the gas containing the $SO_3$ is passed countercurrently over the surface of a stream of concentrated sulfuric acid, or using a bubbling type absorber in which the gas containing $SO_3$ is bubbled through concentrated sulfuric acid, or using a packed absorption tower in which the gas containing the $SO_3$ is passed up through an absorption tower and concentrated sulfuric acid is passed down through the absorption tower. The concentration of the fuming sulfuric acid is then adjusted to form 6 percent fuming sulfuric acid, and the 6 percent fuming sulfuric acid is reacted with additional acetone cyanohydrin.

The burning of the ammonium sulfate containing mixture must be controlled within a relatively narrow range in order to assure a high yield of sulfuric acid. Specifically, the temperature must be within the range of 850° C. to 1,150° C., preferably 950° C. to 1,050° C. The reaction of ammonium sulfate is thought to be essentially thermal cracking, and at this temperature the formation of $SO_2$ is favored. In a preferred embodiment, the mixture is sprayed into a furnace and burned to form $SO_2$. The furnace may be fired with carbon, as in coal, or hydrocarbon gas, such as natural gas; in any event, the resulting product includes CO and $CO_2$. The burning of the ammonium sulfate results in the oxidation of the ammonium ion, $NH_4^+$, to $N_2$, and oxides of nitrogen. When operating under the preferred conditions of the process, the greatest portion of the nitrogen is present as $N_2$, which is not readily oxidized in the oxidation of $SO_2$ to $SO_3$, and is thus ultimately vented as $N_2$.

After the ammonium sulfate containing mixture has been burned to form a gaseous mixture containing $SO_2$, the gaseous mixture is cooled sufficiently to condense most of the water (usually less than 40° C.), and scrubbed to remove the water, undecomposed sulfuric acid and ash, heated to between 300° and 500° C., and is then passed over a catalyst. Platinum containing catalysts are operative, but vanadium containing catalysts are preferred since they are less readily poisoned, and because they are not as reactive with nitrogen and thus minimize the amount of $N_2$ that is oxidized. The oxidation of $SO_2$ to $SO_3$ is preferably carried out by passing the gas through a catalyst bed at a temperature of about 400° to 600° C. The formation of $SO_3$ from $SO_2$ is exothermic, and a suitable heat exchange unit can be employed using this heat of reaction to preheat the incoming gas; of course, the heat can be supplied from another source.

Oxygen should be added to the gaseous mixture in an amount about 100 to 200 percent in excess on a molar basis of that stoichiometrically necessary to react with the $SO_2$ and form $SO_3$.

The gas is then cooled and the $SO_3$ absorbed with concentrated sulfuric acid, usually to a temperature less than 300° C. to form fuming sulfuric acid (oleum) having a $SO_3$ concentration of greater than 6 percent. This is diluted with water or weak acid to form about 6 percent fuming sulfuric acid (oleum), and this 6 percent fuming sulfuric acid is used to react with acetone cyanohydrin and alcohol with the formation of methyl methacrylate and ammonium sulfate.

After the $SO_3$ is absorbed from the gas, the remainder of the gas is vented.

In the following examples which illustrate the invention, all parts and percentages are by weight unless otherwise specified.

EXAMPLE I 400 parts acetone cyanohydrin was slowly added to 610 parts of 6% oleum. The temperature was allowed to rise to 100° C. After the addition was completed, the mixture was heated to 115° C. for an hour. Ten parts tannic acid were then added to inhibit polymerization. 320 parts methanol and 170 parts water were then added to the mixture, and the mixture was heated to 100° C.; the vapor produced was fractionated to separate and recover methyl methacrylate and methanol. After the vapor ceased to contain appreciable amounts of methyl methacrylate, the residue was removed, diluted with sufficient water to prevent crystallization, and analyzed. The residue, after dilution, contained 36.8% $H_2SO_4$; 29.0% water; 24.2% $(NH_4)_2SO_4$; 8.5% $C_3H_4O(NH_4SO_3)_2$; and 1.5% organics having the empirical formula $C_5H_{10}O_3$. (The method of analysis was such that $NH_4HSO_4$ was measured as partly $H_2SO_4$ and partly $(NH_4)_2SO_4$.) This diluted residue was then introduced into a gas fired burner at the base of the flame and sprayed upward at a rate of 12.0 cc./minute under 150 lbs./in.² pressure with natural gas at a rate of 1,250 cc./minute and air at a rate of 17,000 cc./minute.

The effluent gas was then cooled to 32° C. and scrubbed to remove water, undecomposed sulfuric acid, and ash, and the resulting gas had the following analysis:

| | | |
|---|---|---|
| $O_2$ | – | 3.0 mole % |
| $SO_2$ | – | 8.8 mole % |
| $CO_2$ | – | 9.1 mole % |
| $N_2$ | – | 79.1 mole % |

Nitrogen Oxides as $NO_2$–50 parts per million.

The gas was then heated to 440° C. by passing through heating coils and then passing through a vanadium pentoxide catalytic bed containing 4 litre of catalyst at a rate of 106,800 cc./minute. The catalyst was preheated to 540° C. by circulation of heated air through the bed. Air was introduced at a rate of 14,760 cc./minute. The resulting gas had the following analysis:

| | | |
|---|---|---|
| $SO_2$ | – | 0.3 mole % |
| $SO_3$ | – | 6.5 mole % |
| $O_2$ | – | 4.5 mole % |
| $N_2$ | – | 82.7 mole % |
| $CO_2$ | – | 6.5 mole % |

Nitrogen oxides as $NO_2$–40 parts per million.

This gas was cooled to 200° C. and then the $SO_3$ absorbed with concentrated sulfuric acid by passing the gas at the rate of 97,800 cc./minute through a series of absorption towers packed with graded quartz. The gas had the following analysis on completion of this treatment:

| | | |
|---|---|---|
| $SO_2$ | – | 0.3 mole % |
| $SO_3$ | – | 0.001 mg. per cc. |
| $O_2$ | – | 4.8 mole % |
| $N_2$ | – | 88.0 mole % |
| $CO_2$ | – | 6.9 mole % |

Nitrogen oxides as $NO_2$–20 parts per million.

Twenty percent oleum containing small amounts of $HNO_3$ was recovered. This was diluted with water to form a 6 percent oleum solution, and this material was recycled for reaction with acetone cyanohydrin.

EXAMPLE II 400 parts acetone cyanohydrin was slowly added to 610 parts of 6% oleum. The temperature was allowed to rise to 100° C. After the addition was completed, the mixture was heated to 115° C. for an hour. Ten parts tannic acid was then added to inhibit polymerization. 320 parts methanol and 180 parts water were then added to the mixture, and the mixture was treated to 100°1 C.; the vapor produced was fractionated to separate and recover methyl methacrylate and methanol. After the vapor ceased to contain appreciable amounts of methyl methacrylate, the residue was removed, diluted with sufficient water to prevent crystallization, and analyzed. The residue, after dilution, contained 35.8% $H_2SO_4$, 30.8% water, 23.5% $(NH_4)_2SO$, 8.4% $C_3H_4O(NH_4SO_3)_2$, and 1.5% organics having the empirical formula $C_5H_{10}O_3$. (The method of analysis was such that $NH_4HSO_4$ was measured as partly $H_2SO_4$ and partly $(NH_4)_2SOB4$.) This diluted residue was then introduced into a gas fired furnace above the burner flame and sprayed downward at a rate of 4,360 lb./hr. under a pressure of 120 lbs./in.² with natural gas at a rate of 8,700 standard cubic feet/hr. and air at a rate of 150,000 standard cubic feet/hr.

The gas was then cooled to 40° C. and scrubbed to remove water, undecomposed sulfuric acid, and ash. The resulting gas had the following analysis:

| | | |
|---|---|---|
| $SO_2$ | – | 6.0 mole % |
| $CO_2$ | – | 9.9 mole % |
| $O_2$ | – | 3.1 mole % |
| $N_2$ | – | 81.0 mole % |

Nitrogen oxides as $NO_2$–40 parts per million.

The gas was then heated to 440° C. by passing through heating coils and then passing through a platinum catalytic bed containing 870 Troy ounces of catalyst at a rate of 431,000 cubic feet/hour. The platinum bed was preheated to about 500° C. by circulation of heated air through the bed. Air was introduced at a rate of 33,600 standard cubic feet/hour. The resulting gas had the following analysis:

| | | |
|---|---|---|
| $SO_2$ | – | 0.2 mole % |
| $SO_3$ | – | 4.9 mole % |
| $CO_2$ | – | 8.5 mole % |
| $O_2$ | – | 3.5 mole % |
| $N_2$ | – | 82.9 mole % |

Nitrogen oxides as $NO_2$–35 parts per million.

This gas was then cooled to 225° C. and the $SO_3$ absorbed with concentrated sulfuric acid by passing the gas at the rate of 361,700 cubic feet per hour through a series of porcelain packed absorption towers. The gas had the following analysis on completion of this treatment:

| | | |
|---|---|---|
| $SO_2$ | – | 0.3 mole % |
| $O_2$ | – | 3.7 mole % |
| $CO_2$ | – | 8.9 mole % |
| $N_2$ | – | 87.1 mole % |
| $SO_3$ | – | 30 mg./cu. ft. |

Nitrogen oxides as $NO_2$–30 parts/million. 20% oleum containing small amounts of $HNO_3$ was recovered. This was diluted with water to form a 6% oleum solution, and this material was recycled for reaction with acetone cyanohydrin.

I claim:

1. In a process for the production of a sulfur dioxide-containing gas suitable for use in the manufacture of sulfuric acid, the steps of spraying a waste liquor comprising a sulfur acid and a substantial amount of an ammonium salt into a reaction chamber, and heating the resultant waste liquor therein to a temperature of from 850° to 1,150° C. in the presence of molecular oxygen, to obtain an $SO_2$-containing gas essentially free of nitrogen oxides.

2. The process as defined in claim 1 wherein the molecular oxygen is in the form of air.

3. The process as defined by claim 1 wherein the sulfur acid is sulfuric acid.

4. In a process for the production of a sulfur dioxide-containing gas suitable for use in the manufacture of sulfuric acid, the steps of spraying waste liquor comprising a sulfur acid and a substantial amount of an ammonium salt into a first chamber of a combustion furnace, heating said waste liquor therein to a temperature of from 850° to 1,150° C. in the presence of an oxygen-containing gas, passing said gases discharging from said first chamber into a second chamber of a combustion furnace and introducing therein oxygen to obtain an $SO_2$-containing gas essentially free of nitrogen oxides.

5. A process as defined in claim 1 wherein the waste liquor comprises inorganic ammonium salts, organic ammonium salts, sulfuric acid, and water.

6. A process as defined by claim 4 wherein the waste liquor comprises inorganic ammonium salts, organic ammonium salts, sulfuric acid, and water.

7. A process as defined by claim 1 wherein the reaction temperature is 950°–1,050° C.

8. A process as defined by claim 4 wherein the reaction temperature is 950°–1,050° C.

9. A process as defined by claim 5 wherein the reaction temperature is 950°–1,050° C.

10. A process as defined by claim 6 wherein the reaction temperature is 950°–1,050° C.

* * * * *

UNITED STATES PATENT OFFICE
CERTIFICATE OF CORRECTION

Patent No. 3,645,683     Dated Feb. 29, 1972

Inventor(s) Charles Levi Isbell, Jr.

It is certified that error appears in the above-identified patent and that said Letters Patent are hereby corrected as shown below:

Column 3, Line 8 - "(NHhd4)$_2$SO$_4$" should be -- (NH$_4$)$_2$SO$_4$ --

Column 3, Line 65 - "100°1C" should be -- 100°C. --

Column 3, Line 71 - "(NH$_4$($_2$SO," should be -- (NH$_4$)$_2$SO$_4$, --

Column 3, Line 74 - "(NH$_4$)$_2$SOB4.)" should be -- (NH$_4$($_2$SO$_4$.) --

Signed and sealed this 5th day of December 1972.

(SEAL)
Attest:

EDWARD M. FLETCHER, JR.
Attesting Officer

ROBERT GOTTSCHALK
Commissioner of Patents